April 27, 1954
K. H. MEYERHOLTZ ET AL
2,676,533
BAR MARKING MACHINE
Filed Feb. 27, 1952
2 Sheets-Sheet 1
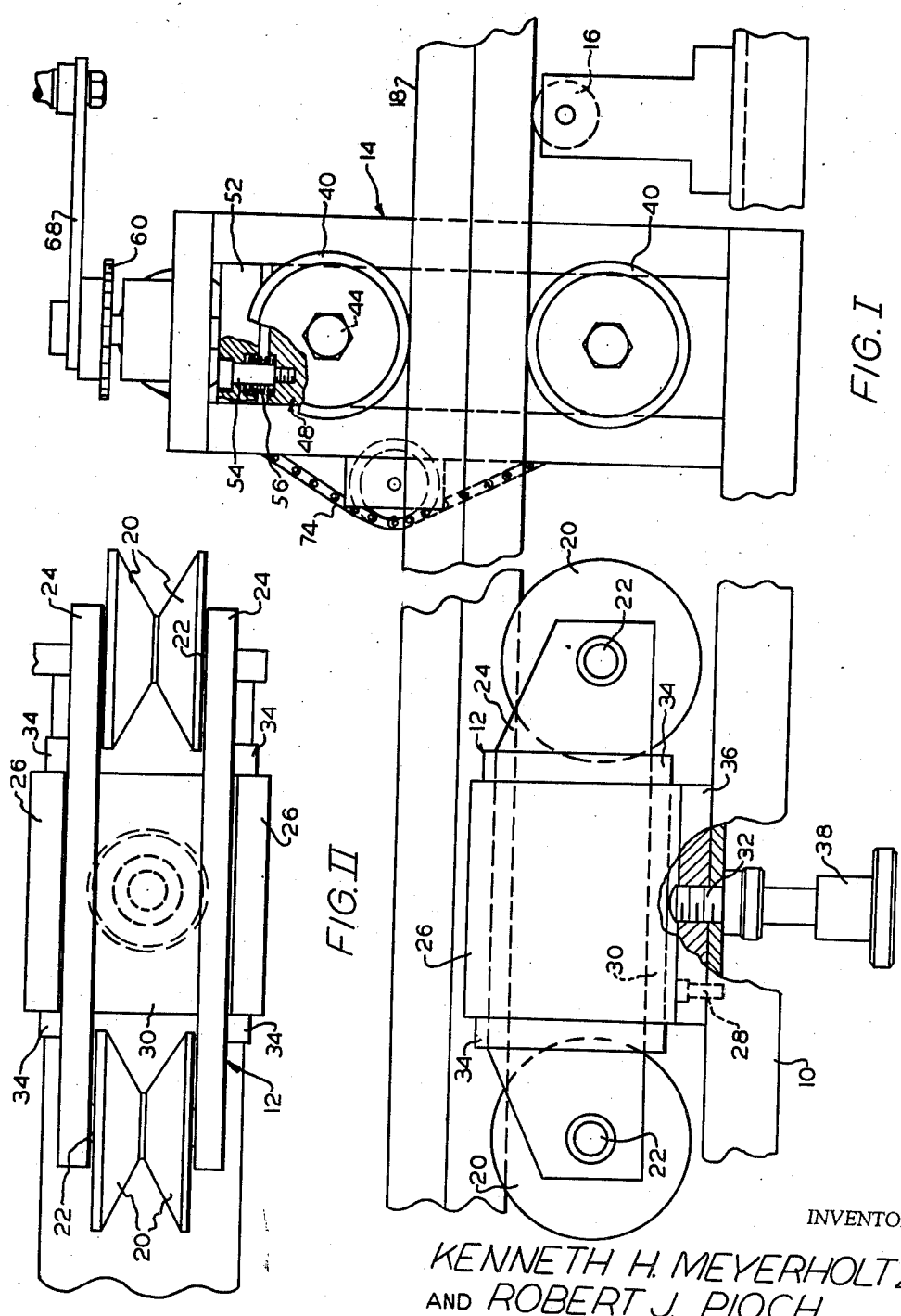
INVENTORS
KENNETH H. MEYERHOLTZ
AND ROBERT J. PIOCH
BY
*Townsend M Beaman*
ATTORNEY

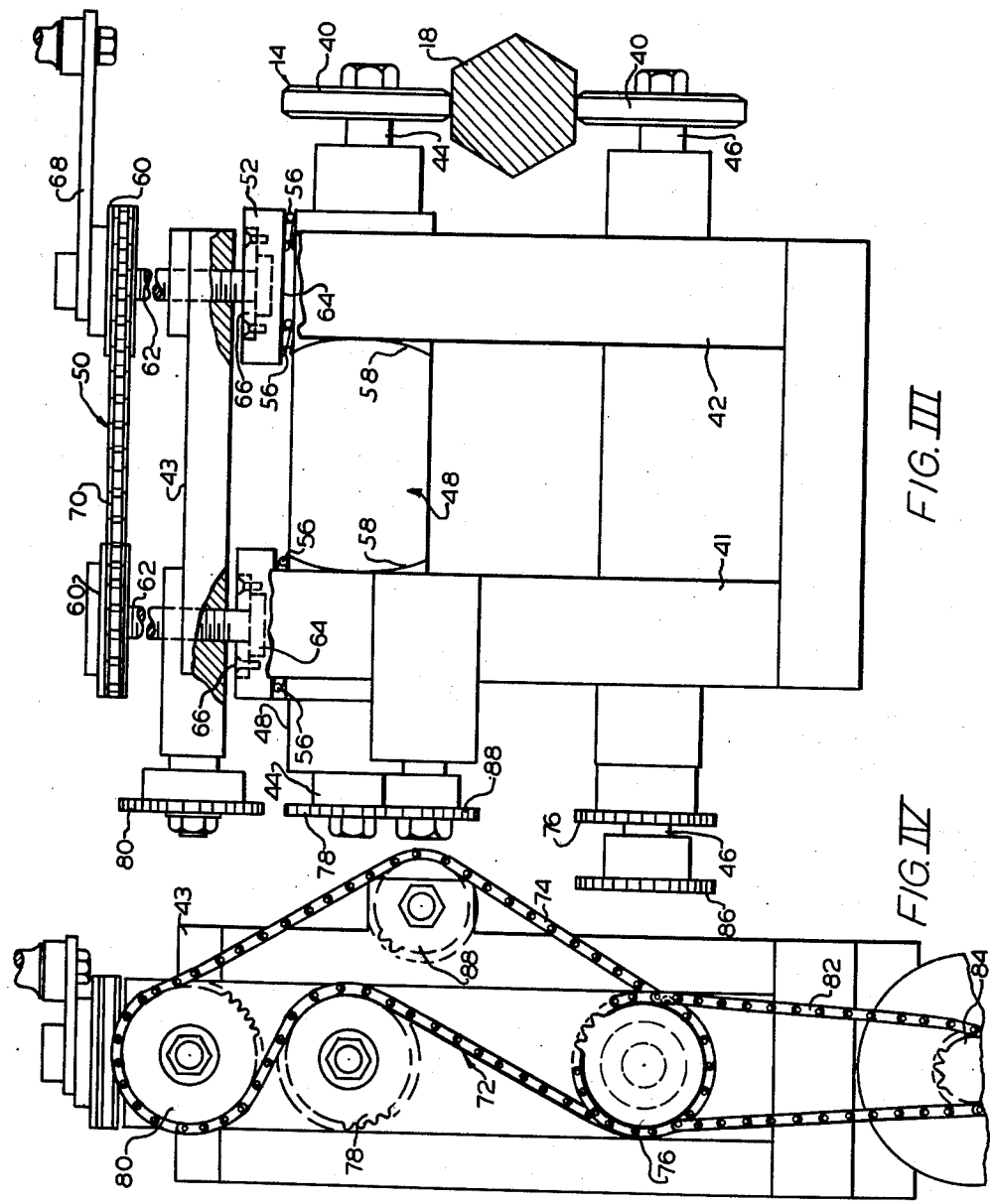

Patented Apr. 27, 1954

2,676,533

UNITED STATES PATENT OFFICE 2,676,533

BAR MARKING MACHINE

Kenneth H. Meyerholtz and Robert J. Pioch, Jackson, Mich., assignors to Aeroquip Corporation, Jackson, Mich., a corporation of Michigan Application February 27, 1952, Serial No. 273,752

1 Claim. (Cl. 101—6)

This invention relates to a machine for use to mark bar stock with the manufacturer's trademark and has particular reference to the marking of bar stock which is subsequently cut into sections to form coupling parts, with each such part having the manufacturer's trade-mark impressed thereon.

It is a requirement of such machines that they should be capable of feeding the bar stock between marking die wheels, which operate to impress the trade-mark upon the bar stock, and that this feeding movement and the operation of the marking die wheels should be capable of taking place without the bar stock becoming warped.

In the operation of such a machine the bar stock is subjected to extreme pressure by the marking die wheels between which it is fed, such that a drag is imposed upon the bar stock, which tends to subject the bar stock to warping. This tendency to drag and warp is particularly pronounced in connection with lighter bar stock, corresponding to thickness of 1″ or less.

It is an important object of the present invention to provide a bar stock marking machine incorporating marking die wheels between which the bar stock is capable of being fed in an efficient manner, such that the bar stock will not be liable to warp as it is advanced between the marking die wheels and is marked thereby.

The above and further objects and advantages of the invention will become apparent from a consideration of the following detail description of one practical embodiment with reference to the accompanying drawings and from a consideration of the appended claim.

In the drawings:

Fig. I is a fragmentary side elevational view of a bar marking machine in accordance with the invention, with portions of the base structure being broken away, or omitted, Fig. II is a plan view of the bar stock locating rollers as seen on the left of Fig. I, Fig. III is an elevational view looking on the left hand end of the bar marking die wheel assembly as seen on the right of Fig. I, and with upper portions thereof broken away, and Fig. IV is a detail view of the chain drive means employed to drive sprocket wheels of the bar marking die wheel assembly as seen in Fig. III.

Referring to the drawings, 10 indicates a horizontally extending table which may be of open framework girder construction and is supported upon vertical pedestals (not shown), with the table 10 supporting thereon, in longitudinally spaced relation, in the direction of travel of the bar stock through the machine, a tapered roller assembly, indicated generally at 12, a marking wheel marking assembly, indicated generally at 14, and idler bar stock supporting rollers 16, the bar stock being indicated at 18.

The tapered roller assembly 12 is constituted by two cooperating pairs of bevelled discs 20 rotatably supported upon spindles 22 supported in horizontally spaced plate members 24 mounted for guided vertical reciprocation upon opposite sides of vertically extending plate members 26 fixedly supported upon the table 10, as by the screw studs 28, with the frame members 24 being connected with a bottom central block 30 against which an adjustable screw spindle 32 bears to effect vertical adjustment of the discs. The frame members 24 present side flanges 34 mounted in sliding guided relation to the opposite vertical edges of the plate members 26. The screw spindle 32 is mounted upon the table 10 to depend therefrom, being screwed through a fixed base block 36 and being adjustable from beneath the table 10 by actuation of the hand knob 38. The construction provides that the frame structure 24, 30 supports the bevelled disc assemblies 20 in axially spaced relationship and for vertical adjustment by the simple actuation of the hand knob 38 and screwed spindle 32, with the elongated bar stock 18 supported upon the taper rollers constituted by the discs 20 and confined horizontally therebetween in correct axial alignment with respect to the die wheels 40 of the marking die wheel marking assembly 14.

Referring now to this marking die wheel marking assembly 14, this comprises a column structure 41, 42 fixedly supported upon the table 10 to extend vertically therefrom and tied at the top by a horizontal plate 43. This frame structure supports the marking die wheels 40 spaced from one side of the column 42, as seen in Fig. III, with the marking die wheels axially aligned with respect to the central longitudinal axis of the tapered roller assembly constituted by the discs 20.

The marking die wheels, which have the manufacturer's trade-mark at circumferentially spaced intervals around their outer peripheries, are mounted upon a pair of shafts 44, 46 of which the upper shaft 44 is mounted in a block assembly, indicated generally at 48, itself vertically adjustable upon the frame columns 41 and 42 by a chain and sprocket mechanism indicated generally at 50. At one end of this block assembly 48, corresponding to the end thereof where the upper marking die wheel is located, the block is connected with the chain and sprocket assembly 50 through the medium of a separate plate 52 connected with the block assembly 48 by screw studs, of which one is indicated at 54 in Figure 1. The plate 52 is maintained spaced apart from the block 48 by the action of springs 56 encircling portions of the studs which extend between the two plates and engaging the plates at their ends and which are mounted in the plate 52 to be and which are mounted in the plate 52 to be vertically slidable with respect thereto under the restraining influence of coil springs 56. This plate and spring assembly 52 and 56 permit the corresponding end of the block assembly 48 to partake, automatically, of slight vertical adjustment sufficient to permit the upper marking wheel to adjust itself to such variations in thickness as may exist in the bar stock 18 as presented between the marking die wheels 40. Such adjustment will be attendant with a slight rocking movement of the block assembly 48, which is permitted by the arcuate surfaces 58 on the block assembly bearing against the columns 41 and 42.

The chain and sprocket assembly 50 includes a pair of sprocket wheels 60 secured upon the upper ends of a pair of screwed vertical spindles 62 mounted in the frame plate 43 and carrying at their lower ends enlarged portions 64 retained in recessed portions of the block assembly 48 by the retainer plates 66.

The one screwed spindle has a handle 68 mounted thereon, actuation of which rotates the sprocket wheels 60, endless chain 70 and spindles 62 to raise or lower the block assembly 48 and thereby effect positive adjustment of the distance between the marking die wheels 40 to suit the machine to the handling of bar stock of different thickness.

It is desired that the bar stock should be fed lengthwise between the marking die wheels by the pressure exerted thereon as the wheels are positively rotated from a suitable motor (not shown) through a sprocket and chain assembly, indicated generally at 72 (Fig. IV). To this end it is necessary that the two marking die wheels be rotated in the same direction, for which purpose the chain 74 is passed from front to back of a pair of sprocket wheels 76 and 78 and over an idler sprocket wheel 80, the sprocket wheel 76 being driven from a chain 82 connected with the sprocket wheel 84, driven by the said motor, and passed over a sprocket wheel 86 mounted in the shaft 46 alongside the sprocket wheel 76. The sprocket wheel 78 is mounted to be adjusted vertically with the block assembly 48, as the latter is adjusted by actuation of the handle 68 to rotate the sprocket wheels 60. A further idler sprocket wheel 88 completes the necessary sprocket wheel assembly for guiding the endless chain 74 and taking up slack for all adjusted positions of the sprocket wheel 76.

In operation, the die wheels 40 are adjusted to suit the thickness of the bar stock to be marked. This is done by actuating the handle to raise or lower the block assembly 48 and thus adjust the spacing between the marking die wheels. At the same time the locating bevelled disc assemblies 20 are correspondingly adjusted vertically by actuation of the knob 38 to ensure that the bar stock is axially aligned with respect to the space between the marking die wheels 40. A length of bar stock 18 is then placed upon the locating wheel assembly and moved to present one end thereof to the marking die wheels. With these positively rotated by the endless chain and sprocket wheel assembly 72 the marking die wheels will cause the bar stock to be progressively moved through marking die wheels as the latter operate to impress the manufacturer's trademark on the bar stock. Such slight irregularities in thickness as may exist in the bar stock will be automatically compensated for by the self-adjustment of the upper marking die wheel as the bar stock is presented thereto, this adjustment being permitted by the resilient mounting provided by the coil springs 56 in conjunction with the rocking adjustment permitted by the arcuate surfaces 58.

The machine is of robust construction and is simple to operate, yet the positive drive mechanism provided by the chain and sprocket assembly 72, and the adjustments above described, permit the machine to handle light weight bar stock without warping as well as different thicknesses of bar stock, including heavier bar stock.

Having thus described our invention, what we claim as novel and wish to secure by Letters Patent is as follows:

In a bar stock marking machine, elongated horizontal frame structure having a vertically extending column structure comprising spaced apart columns joined at the top by a horizontal plate, rotary members mounted on said frame structure at longitudinally spaced intervals for supporting a length of bar stock for movement through the machine, said rotary members including a pair of marking wheels adapted to operate upon and mark the bar stock as it is moved, said marking wheels including an upper marking wheel, block structure carrying said upper marking wheel, said block structure being vertically guided upon said column structure and including a central portion with arcuate end surfaces bearing against the inside of said spaced apart columns, said block including an upper plate and resilient means connecting said plate with said block structure so as to permit limited relative movement between the two with attendant rocking of the block structure by the engagement of said arcuate surfaces with said columns, means mounted upon said top column plate and connected with said block structure for adjusting the structure vertically upon said column to positively adjust the spacing between said marking wheels, horizontal shafts on said column structure, said shafts extending beyond the said spaced apart columns and carrying said marking wheels upon the outside of one of said spaced apart columns, said shafts carrying sprocket wheels on the outside of the other column, said top column plate also carrying a sprocket wheel, and drive means for positively rotating said marking wheels, said drive means comprising an endless chain engaged with said sprockets for rotating said shafts, said sprocket wheels including an idler sprocket at one end of said chain, a driven sprocket at the opposite end of the chain and an intermediate sprocket driven by the chain, said driven and intermediate sprockets being connected to positively drive the shafts carrying said marking wheels.

References Cited in the file of this patent

UNITED STATES PATENTS

| Number | Name | Date |
| --- | --- | --- |
| 161,269 | Perrin | Mar. 23, 1875 |
| 291,436 | Wagner | Jan. 1, 1884 |
| 445,291 | Treat | Jan. 27, 1891 |
| 693,362 | Bancroft | Feb. 18, 1902 |
| 1,367,066 | McDonough | Feb. 1, 1921 |
| 2,202,110 | Maurer | May 28, 1940 |
| 2,227,694 | Bates | Jan. 7, 1941 |
| 2,470,075 | Robbins | May 10, 1949 |
| 2,497,386 | Zarobsky | Feb. 14, 1950 |
| 2,563,403 | Ford | Aug. 7, 1951 |